(12) United States Patent
Marr, Jr. et al.

(10) Patent No.: US 9,965,267 B2
(45) Date of Patent: May 8, 2018

(54) DYNAMIC INTERFACE FOR FIRMWARE UPDATES

(71) Applicant: Raytheon Company, Waltham, MA (US)

(72) Inventors: Harry B. Marr, Jr., Manhattan Beach, CA (US); Jeffrey Jay Logan, Cuver City, CA (US); Daniel Thompson, Hermosa Beach, CA (US)

(73) Assignee: Raytheon Company, Waltham, MA (US)

( * ) Notice: Subject to any disclaimer, the term of this patent is extended or adjusted under 35 U.S.C. 154(b) by 176 days.

(21) Appl. No.: 14/945,992

(22) Filed: Nov. 19, 2015

(65) Prior Publication Data
US 2017/0147321 A1    May 25, 2017

(51) Int. Cl.
G06F 9/45       (2006.01)
G06F 9/445     (2018.01)
G01S 7/02       (2006.01)

(52) U.S. Cl.
CPC ................ *G06F 8/65* (2013.01); *G01S 7/021* (2013.01)

(58) Field of Classification Search
CPC .................................. G06F 8/65; G01S 7/021
See application file for complete search history.

(56) References Cited

U.S. PATENT DOCUMENTS 4,217,580 A    8/1980    Lowenschuss
4,743,905 A    5/1988    Wiegand
4,891,646 A    1/1990    Wiegand
(Continued)

FOREIGN PATENT DOCUMENTS

CA       1119702 A    3/1982
CN    102830637 A    12/2012
(Continued)

OTHER PUBLICATIONS

"International Application Serial No. PCT/US2017/025890, International Search Report dated Jul. 12, 2017", 5 pgs.
(Continued)

*Primary Examiner* — Ziaul A Chowdhury
(74) *Attorney, Agent, or Firm* — Schwegman Lundberg & Woessner, P.A.

(57) ABSTRACT

An electronic warfare (EW) devices and a method of providing jamming techniques are generally described. Firmware is updated by eliminating an existing jamming technique, adding a new technique and/or changing parameters of one of the techniques in the firmware. Changing the technique parameters includes adding a new parameter, deleting an existing parameter, changing the range of values for an existing parameter and changing the order of the parameters to be transmitted by an Operational Flight Program (OFP) to the firmware to generate the technique. The OFP reads a published register mapping specifying parameters to use in generating the jamming techniques in the EW firmware, a range of the parameters and an order of the parameters. The jamming techniques are generated using parameters transmitted by the OFP to the firmware. The same OFP is used to trigger generation of jamming techniques prior to and after the updating of the firmware.

16 Claims, 4 Drawing Sheets

(56) References Cited

U.S. PATENT DOCUMENTS

| | | | |
|---|---|---|---|
| 4,990,920 A * | 2/1991 | Sanders, Jr. | G01S 7/38 |
| | | | 342/14 |
| 5,003,312 A | 3/1991 | Madni et al. | |
| 5,287,110 A * | 2/1994 | Tran | G01S 7/38 |
| | | | 342/13 |
| 5,899,923 A | 5/1999 | Kroll et al. | |
| 5,963,164 A * | 10/1999 | Tsui | G01S 7/021 |
| | | | 342/13 |
| 6,308,228 B1 | 10/2001 | Yocum et al. | |
| 6,327,498 B1 | 12/2001 | Kroll | |
| 6,448,921 B1 * | 9/2002 | Tsui | G01S 7/021 |
| | | | 342/13 |
| 6,640,334 B1 | 10/2003 | Rasmussen | |
| 6,721,358 B1 | 4/2004 | Pace et al. | |
| 7,145,504 B1 | 12/2006 | Newberg et al. | |
| 7,475,080 B2 | 1/2009 | Chowdbary et al. | |
| 7,657,313 B2 | 2/2010 | Rom | |
| 7,982,654 B2 | 7/2011 | Low | |
| 7,987,449 B1 * | 7/2011 | Marolia | G06F 8/68 |
| | | | 709/220 |
| 8,224,234 B1 * | 7/2012 | Schuster | H04K 3/42 |
| | | | 342/13 |
| 8,341,099 B2 | 12/2012 | Khosravy | |
| 8,365,205 B2 | 1/2013 | Chen et al. | |
| 8,392,149 B1 * | 3/2013 | Spencer | G01S 7/021 |
| | | | 702/193 |
| 8,494,464 B1 * | 7/2013 | Kadambe | H04K 3/45 |
| | | | 342/14 |
| 8,510,240 B2 | 8/2013 | Patrao et al. | |
| 8,555,273 B1 * | 10/2013 | Chia | G06F 8/665 |
| | | | 717/168 |
| 2002/0181415 A1 * | 12/2002 | West | H04L 67/36 |
| | | | 370/312 |
| 2002/0184385 A1 * | 12/2002 | Kato | H04L 29/06 |
| | | | 709/237 |
| 2004/0201518 A1 | 10/2004 | Pace et al. | |
| 2006/0001568 A1 * | 1/2006 | Alford | G09B 9/003 |
| | | | 342/169 |
| 2007/0156190 A1 | 7/2007 | Cinbis | |
| 2008/0091815 A1 * | 4/2008 | Rao | G06F 8/65 |
| | | | 709/223 |
| 2008/0191924 A1 | 8/2008 | Duff et al. | |
| 2008/0195693 A1 * | 8/2008 | Gao | G06F 8/65 |
| | | | 709/202 |
| 2008/0297394 A1 * | 12/2008 | Dark | G01S 7/021 |
| | | | 342/13 |
| 2010/0169876 A1 * | 7/2010 | Mann | G06F 8/65 |
| | | | 717/170 |
| 2010/0234906 A1 | 9/2010 | Koh | |
| 2011/0309981 A1 * | 12/2011 | Huizing | G01S 3/48 |
| | | | 342/372 |
| 2012/0211563 A1 * | 8/2012 | Gannon | H04M 1/7253 |
| | | | 235/437 |
| 2013/0185094 A1 | 7/2013 | Mukerji et al. | |
| 2014/0122862 A1 * | 5/2014 | Ludwig | G06F 15/177 |
| | | | 713/100 |
| 2014/0362774 A1 | 12/2014 | Marr et al. | |
| 2017/0293019 A1 | 10/2017 | Caldwell et al. | |

FOREIGN PATENT DOCUMENTS

| | | |
|---|---|---|
| GB | 2286308 A | 8/1995 |
| TW | 201727649 A | 10/2017 |
| WO | WO-2005103978 A2 | 11/2005 |
| WO | WO-2011125060 A2 | 10/2011 |
| WO | WO-2017176710 A1 | 10/2017 |

OTHER PUBLICATIONS

"International Application Serial No. PCT/US2017/025890, Written Opinion dated Jul. 12, 2017", 7 pgs.

Chakravarthy, Vasu, et al., "Cognitive Radio—an Adaptive Waveform with Spectral Sharing Capability", Wireless Communications and Networking Conference, IEEE, vol. 2,, (2005), 724-729.

Roome, S J, "Digital radio frequency memory", Electronics & Communication Engineering Journal, vol. 2, No. 4, (Aug. 1990), 147-153.

Schleher, D Curtis, "Section 1.3.2 The Effect of EA on Tracking Radar", Electronic Warfare in the Information Age (1st ed.), Artech House, Inc., (1999), 20-24.

Schleher, D Curtis, "Section 5.5 Advanced DRFM Architecture", Electronic Warfare in the Information Age (1st ed.), Artech House, Inc., (1999), 324-326.

Schleher, D Curtis, "Sections 3.3.2 to 3.4 Deception Jamming", Electronic Warfare in the Information Age (1st ed.), Artech House, Inc., (1999), 167-182.

Schleher, D Curtis, "Sections 5 to 5.1 Digital Radio Frequency Memory", Electronic Warfare in the Information Age (1st ed.), Artech House, Inc., (1999), 293-300.

Spezio, Anthony, "Electronic Warfare Systems", Microwave Theory and Techniques, IEEE Transactions on, vol. 50, No. 3, (Mar. 2002), 633-644.

\* cited by examiner

DYNAMIC INTERFACE FOR FIRMWARE UPDATES

TECHNICAL FIELD

Embodiments pertain to Electronic Warfare (EW) systems. Some embodiments relate to EW systems that are updatable without changing the Operational Flight Program (OFP) mission processor software.

BACKGROUND

Electronic Warfare (EW) systems are typically embedded within an aircraft used to gather intelligence data and perform other missions. EW systems may include specialized hardware, Operational Flight Program (OFP) mission processor software running on the hardware and firmware controlled by the OFP. During missions, the EW system may be used offensively or defensively. For example, the data gathered by the EW system may be used for assessment of target emitters to determine whether to take countermeasures, such as jamming, against the emitters. EW techniques, in each of which the frequency, phase, and amplitude parameters of a waveform are defined as a function of time, may be used to produce the countermeasures. The EW techniques may be capable of having different parameters, parameter ranges and parameter order. The firmware EW techniques may be stored in a register mapping.

While the hardware in the EW system may be able to store a large number of EW techniques in practice, the firmware may be hardware limited to being able to store a limited number of register mappings used to produce a few EW techniques. Thus, to provide effective countermeasures, the firmware in the EW system may be updated from time to time. This may be particularly useful during long missions in which a large number of emitters and other targets on which to take countermeasures may change. When the firmware is reloaded with a new register mapping, however, the OFP is changed. Undesirably, changes to the OFP are expensive and time consuming.

It would thus be desirable to reload the firmware of the EW system without changing the OFP, while still permitting the OFP to operate the new firmware loading with the new register map.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
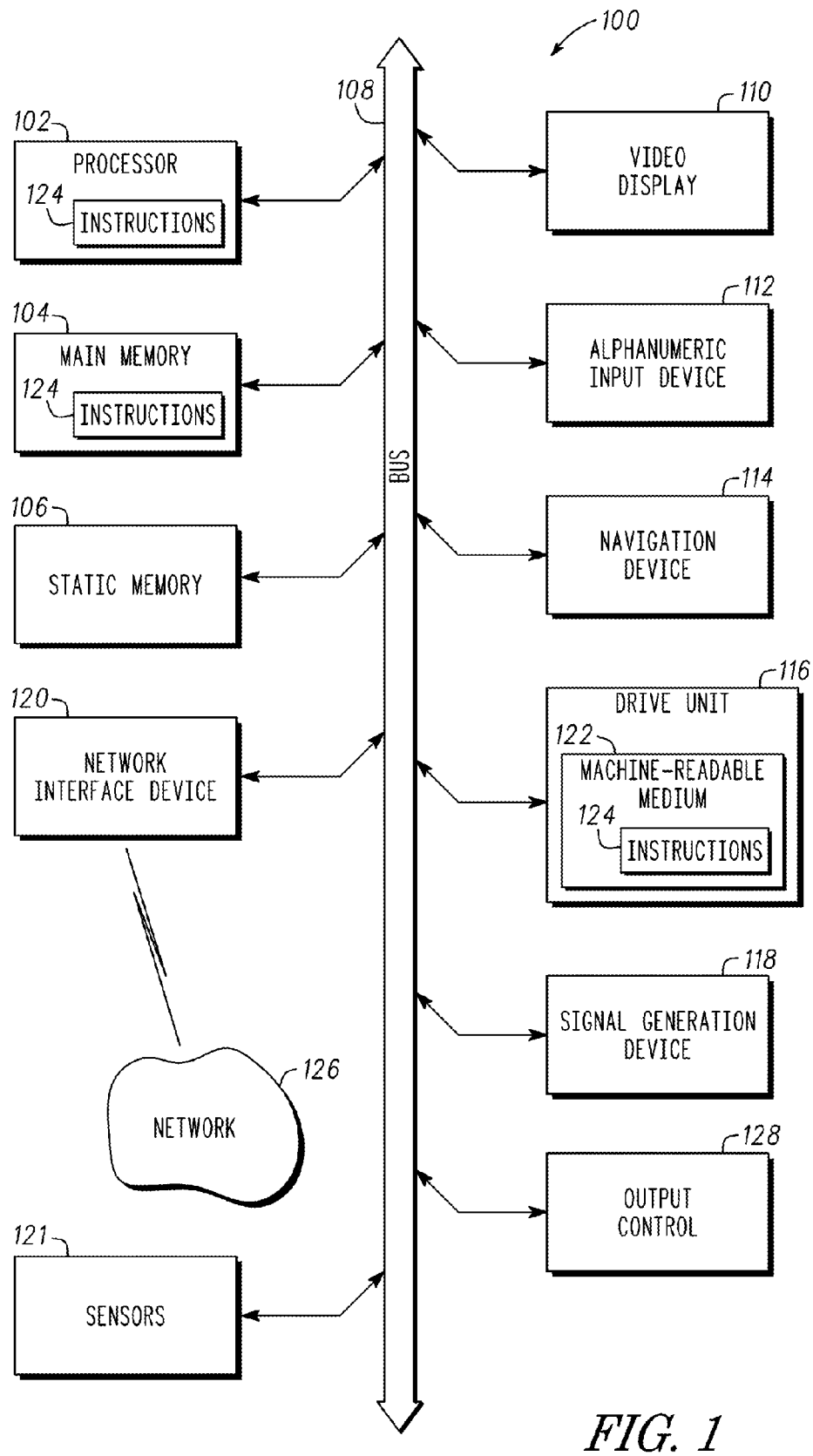
FIG. 1 illustrates a generalized block diagram of an EW system in accordance with some embodiments.

FIG. 1 illustrates a generalized block diagram of an EW system in accordance with some embodiments. In some embodiments, the EW system 100 may be in a vehicle used in EW, such as military land, sea or air vehicles configured to gather intelligence data and perform other missions. In a networked deployment, the EW system 100 may operate in the capacity of a server, a client, or both in server-client network environments. In an example, the EW system 100 may act as a peer machine in peer-to-peer (P2P) (or other distributed) network environment. The EW system 100 may be a specialized computer or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The EW system 100 may include a hardware processor 102 (e.g., a central processing unit (CPU), a GPU, a hardware processor core, or any combination thereof), a main memory 104 and a static memory 106, some or all of which may communicate with each other via an interlink (e.g., bus) 108. The processor 102 may operate using the instructions forming the OFP as described in more detail below. Specifically, the transistors and other components forming the arithmetic logic unit (ALU) and registers may be adjusted to provide, among other processes, the processes performed by the OFP. Although not shown, the main memory 104 may contain any or all of removable storage and non-removable storage, volatile memory or non-volatile memory. The EW system 100 may further include a display unit 110, an alphanumeric input device 112 (e.g., a keyboard), and a user interface (UI) navigation device 114 (e.g., a mouse). In an example, the display unit 110, input device 112 and UI navigation device 114 may be a touch screen display. The EW system 100 may additionally include a storage device (e.g., drive unit) 116, a signal generation device 118 (e.g., a speaker), a network interface device 120, and one or more sensors 121, such as a global positioning system (GPS) sensor, compass, accelerometer, or other sensor. The EW system 100 may include an output controller 128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 116 may include a machine readable medium 122 on which is stored one or more sets of data structures or instructions 124 (e.g., software) embodying or utilized by any one or more of the techniques or functions described herein. The instructions 124 may also reside, completely or at least partially, within the main memory 104, within static memory 106, or within the hardware processor 102 during execution thereof by the EW system 100. In an example, one or any combination of the hardware processor 102, the main memory 104, the static memory 106, or the storage device 116 may constitute machine readable media.

While the machine readable medium 122 is illustrated as a single medium, the term "machine readable medium" may include a single medium or multiple media (e.g., a centralized or distributed database, and/or associated caches and servers) configured to store the one or more instructions 124.

The term "machine readable medium" may include any medium that is capable of storing, encoding, or carrying instructions for execution by the EW system 100 and that cause the EW system 100 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 124 may further be transmitted or received over a communications network 126 using a transmission medium via the network interface device 120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 120 may include one or more physical jacks (e.g., Ethernet, coaxial, or phone jacks) or one or more antennas to connect to the communications network 126.

The EW system 100 may be contained within a housing (not shown) in the vehicle and be implemented, in one embodiment, using a blade server or a blade server-like structure (hereinafter merely referred to merely as a blade server). The different components may be rack mounted in the blade server and may have a cooling fan disposed at at least one end. Other additional cooling mechanisms such as refrigerant may be added, especially as the EW system 100 may process a significant amount of data in a short time (e.g., millions of pulses/sec). For example, the processor 102 executing the OFP instructions may be provided on one or more blades of the blade server while the firmware may contained on multiple blades different from the blades on which the processor is disposed.

As above, in existing EW systems, reconfigurable firmware implemented in a field programmable gate array (FPGA) device may be configured into circuits used to generate and receive jamming waveforms. It may be desirable from time to time to provide new capabilities in situ and update a technique generator used to generate the new waveforms to add and remove capabilities. However, waveform technique development may take a significant amount of time and may entail OFP changes to accommodate the differing capabilities. Moreover, there may be more techniques, and consequently circuitry, used for a given mission than can fit in the firmware due to the limited amount of hardware and processing power associated with the firmware as the vehicle in which the EW system is disposed moves. The jamming techniques available to be generated by the firmware may thus be updated based on geographical location of the vehicle and EW system. When changing the waveforms able to be generated by the firmware, the OFP may also be changed due to the differences between the waveforms and the parameters used to generate the previous waveforms and the parameters used to generate the current waveforms. In either case, changes to the OFP to enable use of the waveforms by the EW system may take hours or days to implement by hand, which is at best impractical. At least some of the embodiments herein thus enable dynamic reconfiguration of the firmware to use different waveform circuitry and generate different jamming techniques during a mission without changing the OFP.

Figure 2:
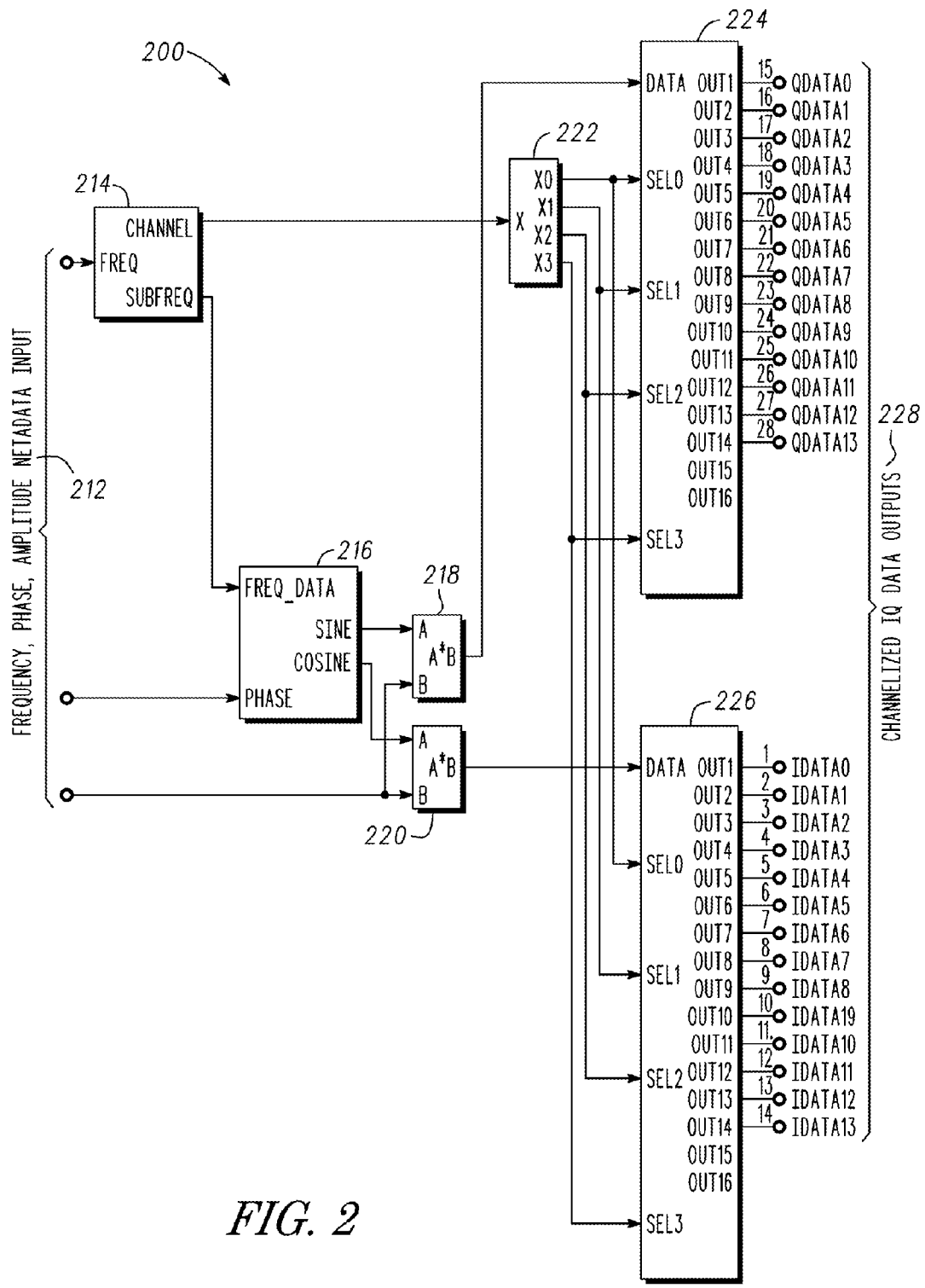
FIG. 2 illustrates a diagram of elements of FPGA firmware in an EW system in accordance with some embodiments.

FIG. 2 illustrates a diagram of elements of FPGA firmware in an EW system in accordance with some embodiments. The FPGA firmware in FIG. 2 may be part of the components of the EW system 100 shown in FIG. 1. In some embodiments, the firmware 200 may generally include a waveform infrastructure with an application programming interface (API) that has a digital signal processing (DSP) infrastructure, a technique application abstraction layer and a techniques layer. The technique application abstraction layer may support the technique engine to leverage the services and produce a variety of techniques using different technique applications. The technique abstraction layer may act much like an operating system.

The waveform infrastructure in the FPGA firmware 200 may provide services that enable generation of waveform techniques. These services may be in a digital processing infrastructure and may include, among others, one or more digital signal processors (DSPs), a frequency generator 214 (that may contain one or more of a frequency modulated (FM) modulator, a phase modulated (PM) modulator, and an amplitude modulated (AM) modulator), a direct digital synthesizer (DDS) 216, a channelizer (channel selector) and an inverse channelizer (reconstructer), a packetizer and inverse packetizer, an analog-to-digital converter (ADC) and a digital-to-analog converter (DAC), and a message passer.

Metadata may be supplied as inputs 212 to generate waveform of the technique. The metadata may be a time varying signal. The metadata may include various parameter values, such as frequency, phase and amplitude of the desired waveform. The metadata may also include FPGA resource usage so that the technique may be loaded into the proper location on the FPGA firmware. The metadata to be used may be stored in a library of elements.

For example, the frequency parameter value may be supplied to the frequency generator 214, which may generate a subfrequency and channel. The phase parameter value, as well as the subfrequency from the frequency generator 214 may be supplied to the DDS 216, which may produce a sine (quadrature-phase or Q) and cosine (in-phase or I) output. The sine and cosine output from the DDS 216 may be supplied to inputs of different multipliers 218, 220, along with the amplitude parameter value. The multiplied sine and cosine values may then be respectively provided as the data input to different demultiplexers 224, 226. The channel output from the frequency generator 214 may be supplied to a bitbasher 222 whose output is then used to select an output of each of the demultiplexers 224, 226 to provide channelized I-Q data 228 of the technique. The bitbasher 222 may receive channel selection data from the frequency generator 214 and perform at least some of: slicing, manipulation, concatenation and augmentation of the channel selection data to create sets of selection outputs each provided to the demultiplexers 224, 226.

The channelized I-Q data may be provided to a packetizer, which may bundle the data into packets. The packets may be provided to another FPGA, where they may be depacketized, sent through an inverse channelizer and then converted to an analog signal using the DAC. This analog signal may then be transmitted through from the vehicle as the desired technique used to counter the signal from the target emitter.

The input metadata may be generated and manipulated by the algorithm used to define the waveform in the same format regardless of the number of channels in the output 228.

Figure 3:
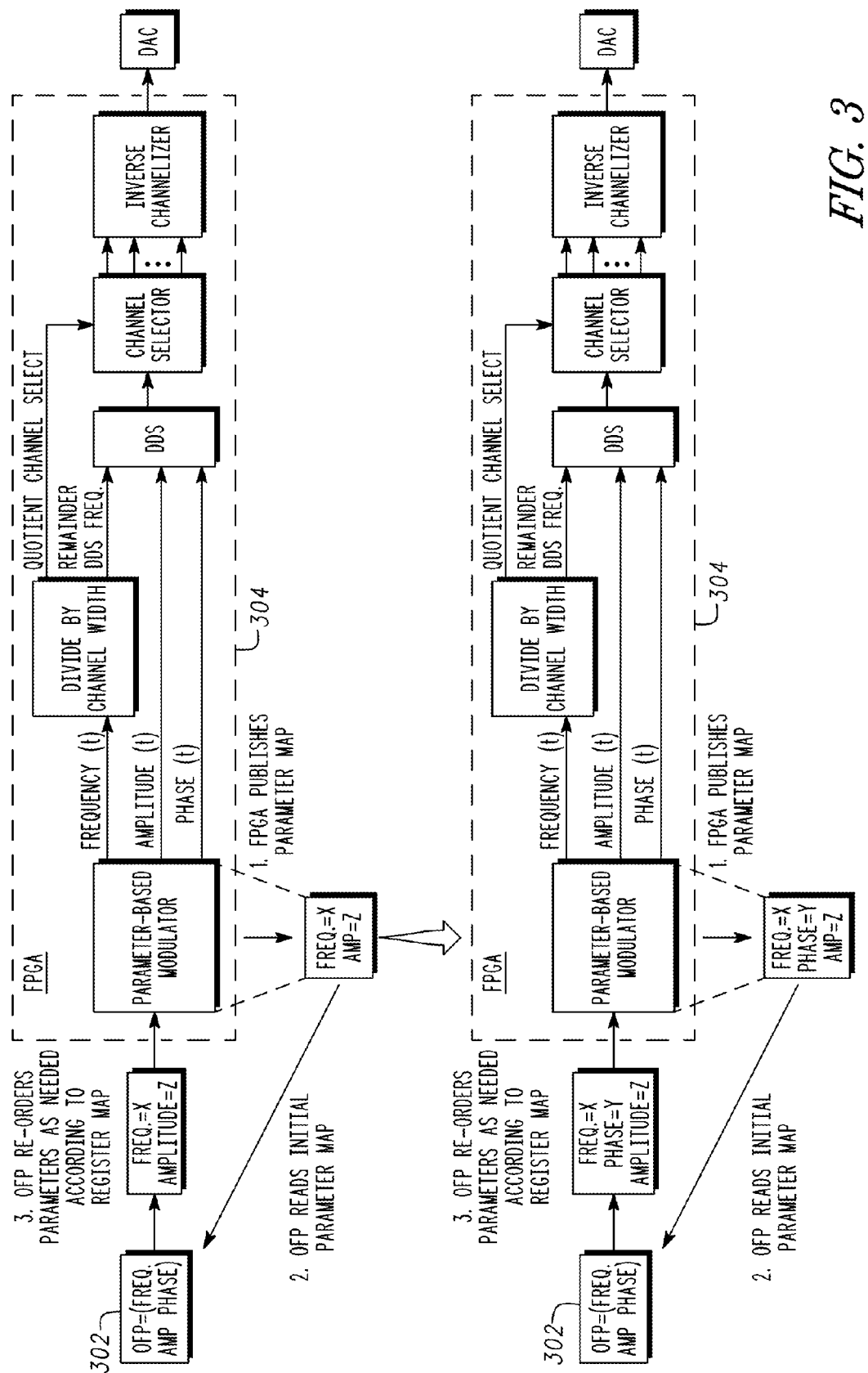
FIG. 3 illustrates updating of technique generation before and after FPGA firmware updating in accordance with some embodiments.

FIG. 3 illustrates updating of technique generation before and after FPGA firmware updating in accordance with some embodiments. Although FIG. 3 shows only the OFP 302 and the FPGA 304, other elements of the EW system, such as a processor and memory are not shown for convenience. In FIG. 3, the FPGA 304 publishes an initial parameter map containing an initial set of parameters and an ordering of the initial set of parameters to use in generating a particular technique.

The OFP 302 may obtain an available set of parameters to be used with various techniques from memory and read the published initial set of parameters. As all of the parameters in the available set of parameters may not be used, the initial set of parameters may have fewer than or the same number of parameters as the available set of parameters. As shown in the example of FIG. 3, three parameters (frequency, amplitude, and phase) may be available to be used by the OFP 302; however the initial set of parameters may indicate that only frequency and amplitude, in that order, are to be used when generation of the technique is desired. In other words, the phase of the technique, when the technique is generated, may be preset.

The OFP 302 may then generate an initial command message. To generate the initial command message, the OFP 302 may order values associated with the parameters in the initial set of parameters as indicated in the initial parameter map. Once the initial command message is generated, the OFP 302 may transmit the initial command message to the FPGA 304 to generate the desired technique.

A new FPGA build may be loaded into the FPGA 304. As shown, the new FPGA build provides the same technique as prior to the build, excepting that the technique now permits the phase of the technique to be set by the OFP 302. The FPGA 304 publishes an updated parameter map containing an updated set of parameters and an ordering of the updated set of parameters to use in generating the technique.

The OFP 302 may obtain the available set of parameters to be used with various techniques from memory and read the published updated set of parameters. Similar to the above, the updated set of parameters may have fewer than or the same number of parameters as the set of available parameters. In some embodiments the metadata of the parameters may be supplied as an input for one of several techniques in a time division duplexed (TDD) manner.

The OFP 302 may then generate a new command message using values for all of the frequency, amplitude and phase parameters. The ordering of the parameters, however, has changed so that the values for the frequency and amplitude parameters are no longer adjacent to each other as in the initial command message; instead, the phase value has been inserted the amplitude and phase parameter values in the new control message. Once the new command message is generated, the OFP 302 may transmit the new command message to the FPGA 304 to generate the desired technique.

As above, different techniques the metadata of the parameters may be supplied as TDD signals. For example, parameter sets for the different techniques currently stored in the firmware may be stored in a file or library available to the OFP 302. The parameters for a particular technique used by the OFP 302, once selected at a particular time slice (using a multiplexer), may be provided to the OFP 302. The OFP 302 may select values accordingly and transmit channelized data through a packetizer along the bus to an inverse packetizer and then to a circuit that converts the values to RF signals of the technique, e.g., using an inverse channelizer and DAC (although other circuitry arrangements may be used to effect a similar conversion) for generation of signals to be transmitted by the EW system. Alternatively, the parameters for the different techniques may be supplied to the OFP 302 and the outputs from the OFP 302 supplied to a multiplexer to generate TDD RF or channelized signals.

Similarly, received RF signals from the emitter targeting the vehicle the EW system is disposed in may be converted to digital signals at an ADC, which may then be provided to a channelizer. The channelized data may subsequently be provided to an inverse packetizer that provides packets to a packetizer. The packetizer may send packetized channelized data to an inverse packetizer. The channelized data may then provided to the user application for processing. The processor may update the waveform techniques and properties, e.g., frequency, bandwidth, Pulse Repetition Time (PRT), etc., in real time based on the received RF signals.

Figure 4:
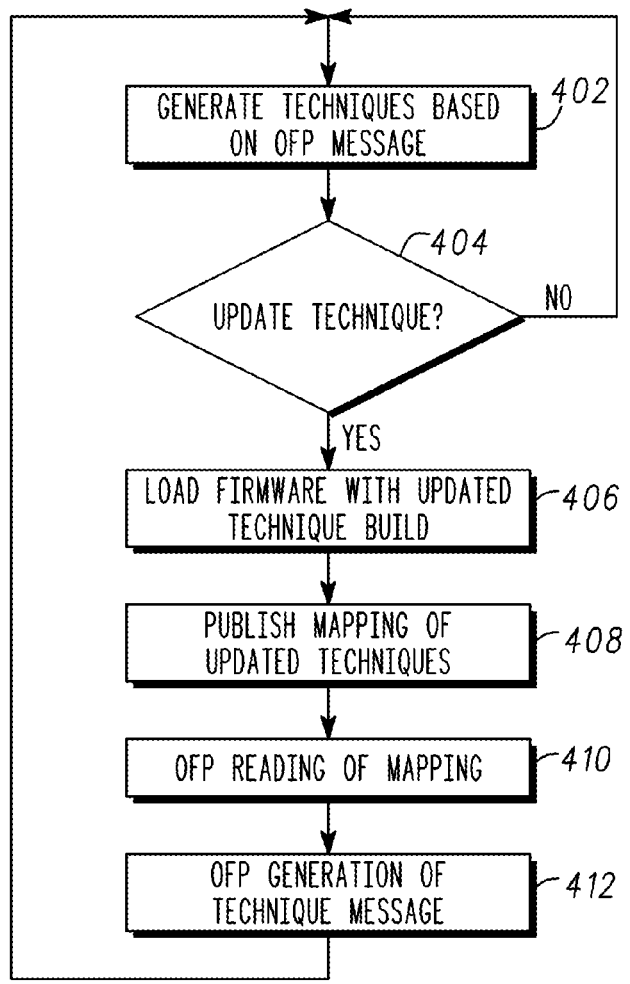
FIG. 4 illustrates a flowchart of adjusting technique generation in accordance with some embodiments.

FIG. 4 illustrates a flowchart of adjusting technique generation in accordance with some embodiments. The operations in the flowchart of FIG. 4 may be performed by an EW system, such as that shown in FIG. 1, in particular the OFP and firmware of the EW system.

At operation 402, one or more techniques may be generated by the firmware based on OFP messages. The OFP messages may contain the appropriate parameter values in the appropriate order to be used by the firmware. The firmware, upon receiving the message, extracts the parameter values and proceeds to use the extracted parameters to generate the desired technique. The message from the OFP thus may be received by the firmware and ordering of the parameter values, that is, values of specific parameters used to generate the technique, may be expected by the firmware at specific locations in the message.

At operation 404, the EW system may determine whether or not an update to the techniques has been provided. This may be desirable as the firmware may be able to store the configurations of only a limited number of techniques. Thus, when technique configurations are to be added or deleted from the firmware, the firmware may be reloaded with the desired techniques.

If an update to the firmware is not desired at operation 404, the method may return to operation 402, where the firmware will continue to generate one or more of the previously loaded techniques based on messages from the OFP. If, however, at operation 404, the EW system determines that an update to the techniques is desired, the one or more new techniques may be loaded into the firmware using a new firmware build at operation 406. In some embodiments, the firmware may wipe the currently stored technique configurations and, upon receiving a set of techniques (that contain new techniques, eliminate current techniques, or adjust current techniques), may load the configurations in the desired location. In some embodiments, the firmware may add the new techniques if space exists (or delete a desired configuration) without wiping the remaining configurations currently loaded into the firmware. The available techniques, whether or not at least some are loaded in the firmware, may be retained in a main memory of the EW system. Thus, the main memory may communicate with the firmware to add/delete/modify the techniques. The firmware build loaded onto the FPGA may have a unique parameter mapping. The firmware build may be updated with new functionality that changes the order of input command and control parameters to be used by the OFP.

Once the techniques are loaded into the firmware, in operation 408 the firmware may publish a mapping of the techniques. The publishing may be in some embodiments provided by a file giving the new register mapping pointers. In some embodiments, the publishing may be a message transmitted from the firmware to the OFP indicating the existence of the file or changes to the file, or more directly changes to the parameter mapping. The mapping may include the parameters to be used for generation of a particular technique, the range of parameter values, and the ordering of the parameters. The firmware may thus indicate that a new set of techniques are available to be used by the OFP. The mapping may include the same parameters used in the previous technique configuration, new parameters that are available to be used by the OFP but were not used in the previous technique configuration or fewer parameters than used in the previous technique configuration. For example, the parameters to be used in the when generating a technique used in the previous technique configuration and still used in the current technique configuration may be the same or may differ (e.g., a particular parameter such as frequency, phase or amplitude may have been preset in the previous technique configuration and is now free to vary, or vice-versa). The ordering of the parameter values used to address the firmware may be adjusted for each technique. Thus, a script may executed in the firmware compile flow such that an OFP readable map of the new parameter orderings is published.

Once the mapping of the updated techniques has been published, the OFP may at operation 410 read the new mapping. When a resource manager of the OFP decides to assign the new technique, it may reference the parameter mapping file to structure the command and control message. This is to say that the OFP may determine which techniques are now available to be called, as well as the parameters that can be used for each technique and the order of those parameters within a message transmitted to the firmware to generate the technique. In some embodiments, the OFP may automatically detect that a new mapping is available, e.g., periodically checking to see whether an update flag has been set before reading the new mapping and resetting the flag. In some embodiments, the OFP may receive a message from the firmware (directly or indirectly via an update controller) informing the OFP of the mapping update. This permits the firmware to communicate with the OFP to allow a dynamic register mapping.

At operation 412, the OFP, using the updated mapping, may form a control message containing parameter values for the techniques to be delivered by the firmware and transmit the command message to the FPGA. The message may indicate, by the location of the parameter values, which techniques are to be generated at operation 402 by the firmware. As above, new parameters may be added or existing parameters deleted as long as the OFP is aware of a master set of parameters. Thus, in the EW system a new technique may be loaded into the firmware and commanded from the same OFP build, and the OFP may command one or more techniques strictly from the firmware register mapping. Although parameters may be loaded to the OFP from a parameter library, if the OFP is unable to identify a new parameter (e.g., the library does not contain a new parameter or the OFP is unable to access the library), the OFP may load predetermined default values for the new parameter for transmission to the firmware.

The firmware build may thus be changed, with one or more jamming techniques added, deleted and/or existing jamming techniques having ordering of the parameters and/or acceptable ranges of values for one or more of the parameters changed. The register mapping indicating the specifics of the parameters in the new firmware build (i.e., which parameters and in which order the firmware expects from the OFP) may be published. The OFP may determine that a new firmware build exists and may adjust messages to the firmware to generate the jamming techniques. Rather than rewriting the OFP based on the new firmware build, the same OFP may be used with different firmware builds.

The approach described above has numerous implementation approaches and should not be limited to the specific example above, but pertains in general to any case where the transmitted waveform itself is to be combined with a second waveform in order for information to be recoverable. The second waveform may be transmitted to the receiver or generated at the receiver by a known algorithm. Under certain specific conditions, the key waveform operation may change the apparent modulation format of the true waveform when it is converted to the cypher waveform.

Although the disclosure discusses EW applications, in other embodiments similar methodology may be adopted for radar applications or other sensory applications. In some embodiments, the methodology may be applicable to any system in which a software processor is writing to an FPGA/programmable hardware device.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:
1. A method of providing jamming techniques from an electronic warfare (EW) system, the method comprising:
updating EW firmware by adding a new jamming technique to the EW firmware and changing parameters of one of the jamming techniques in the EW firmware;
storing parameter sets for a set of jamming techniques including jamming techniques other than those currently available by use of the EW firmware in a library of the EW system, the library storing a greater number of jamming techniques than a number of jamming sets able to be generated by the EW firmware, wherein the new jamming technique is added free from eliminating other jamming techniques;
indicating to an Operational Flight Program (OFP) that the EW firmware has been updated;
generating a jamming technique in the EW firmware using parameters transmitted by the OFP to the firmware, the same OFP being used to trigger generation of jamming techniques prior to and after the updating of the EW firmware; and
transmitting the jamming technique to provide countermeasures against a radar signal impinging on the EW system.

2. The method of claim 1, wherein:
indicating to the OFP comprises publishing a register mapping specifying parameters used in generating the jamming techniques in the EW firmware, a range of each of the parameters and an order of the parameters.

3. The method of claim 2, wherein changing parameters of one of the jamming techniques in the EW firmware comprises:
adding a new parameter to be transmitted by the OFP to the EW firmware to generate the one of the jamming techniques, deleting an existing parameter to be transmitted by the OFP to the EW firmware to generate the one of the jamming techniques, changing the range of values for an existing parameter and changing the order of the parameters to be transmitted by the OFP to the firmware to generate the one of the jamming techniques.

4. The method of claim 2, further comprising the OFP:
periodically checking to see whether an update flag has been set before reading the register mapping and resetting the update flag, and
receiving a message from the EW firmware informing the OFP of publishing of the register mapping.

5. The method of claim 1, further comprising:
the OFP transmitting a predetermined default value for a new parameter, introduced when updating the EW firmware, to the EW firmware in response to the OFP being unable to identify the new parameter from the stored parameter sets.

6. The method of claim 1, further comprising: updating the EW firmware based on geographical location of the EW system.

7. A device comprising:
a physical processor configured to execute software instructions stored in a physical memory;
firmware in communication with the processor, the firmware comprising a firmware build arranged to generate a plurality of signal processing operations each associated with at least one parameter, the firmware arranged to receive an updated firmware build and, in response, publish a register mapping associated with the updated firmware build, wherein the processor is arranged to adjust parameters transmitted to the firmware to generate at least one of the signal processing operations in response to the register mapping being published;

a transceiver arranged to receive signals from an emitter and generate one or more of the signal processing operations in response thereto; and a library arranged to store parameter sets for a set of jamming techniques including jamming techniques other than those currently available by use of the firmware, wherein the software instructions comprise Operational Flight Program (OFP) instructions, wherein the signal processing operations comprise jamming techniques each configured to provide countermeasures against a radar signal impinging on the device, wherein the signals comprise radar signals, wherein the firmware is arranged to generate a limited number of jamming techniques in which the library is configured to store a greater number of jamming techniques than a number of jamming sets able to be generated by the firmware, and wherein the firmware is arranged to add a new jamming technique free from eliminating other jamming techniques in response to the updated firmware build adding the new jamming technique and the firmware being arranged to generate a number of jamming techniques less than the limited number of jamming techniques prior to receiving the updated firmware build.

8. The device of claim 7, wherein:

the updated firmware build comprises at least one of:
  an addition of a new jamming technique to be generated by the firmware,
  a deletion of one of the jamming techniques previously generated by the firmware, and
  a change to one of the jamming techniques generated by the firmware such that the one of the jamming techniques remains able to be generated by the firmware after the updated firmware build.

9. The device of claim 7, wherein:

the updated firmware build comprises the change to one of the jamming techniques, and the published register mapping comprises, for the one of the jamming techniques:
  an addition of a new parameter to be transmitted by the OFP to the firmware to generate the one of the jamming techniques,
  a deletion of an existing parameter to be transmitted by the OFP to the firmware to generate the one of the jamming techniques,
  a change in a range of values for the existing parameter, and
  a change in ordering of parameters to be transmitted by the OFP to the firmware to generate the one of the jamming techniques.

10. The device of claim 7, wherein the firmware comprises:

a frequency generator arranged to provide a frequency and a channel selection data, a direct digital synthesizer (DDS) arranged to receive the frequency from the frequency generator and provide a sine and cosine output, multipliers each arranged to multiply the sine or cosine output from the DDS and respectively provide an amplified sine or cosine output, a bitbasher configured to receive channel selection data from the frequency generator and generate selection outputs, and demultiplexers each arranged to receive the amplified sine or cosine output from one of the multipliers and the selection outputs from the bitbasher, the demultiplexers further arranged to generate channelized IQ data to be provided to the transceiver.

11. The device of claim 10, wherein:

to generate one of the jamming techniques, the OFP configured to transmit a message to the firmware, the message comprising at least one of a frequency value to be supplied to the frequency generator, a phase value to be supplied to the DDS and an amplitude value to be supplied to the multipliers.

12. The device of claim 7, wherein:

the OFP is configured to transmit a predetermined default value for a new parameter, introduced by the updated firmware build, to the firmware in response to the OFP being unable to identify the new parameter from the library.

13. The device of claim 7, wherein one of:

the OFP is configured to periodically check to see whether an update flag has been set before reading the register mapping and resetting the update flag, and the OFP is configured to receive a message from the firmware informing the OFP of the update to the register mapping.

14. The device of claim 7, wherein:

the firmware build is updated based on geographical location of the device.

15. A non-transitory computer-readable storage medium that stores instructions for execution by one or more processors of an electronic warfare (EW) device, the one or more processors to configure the EW device to:

update EW firmware by adding a new jamming technique to the EW firmware and changing parameters of one of the jamming techniques in the EW firmware, store parameter sets for a set of jamming techniques including jamming techniques other than those currently available by use of the EW firmware in a library of the EW system, the library storing a greater number of jamming techniques than a number of jamming sets able to be generated by the EW firmware, wherein the new jamming technique is added free from eliminating other jamming techniques;

indicate to an Operational Flight Program (OFP) that the EW firmware has been updated by publishing a register mapping specifying parameters to use in generating the jamming techniques in the EW firmware, a range of the parameters and an order of the parameters; and generate a jamming technique in the EW firmware using parameters transmitted by the OFP to the firmware, the same OFP being used to trigger generation of jamming techniques prior to and after the updating of the EW firmware.

16. The medium of claim 15, wherein at least one of:

changing parameters of one of the jamming techniques in the EW firmware comprises:
  adding a new parameter to be transmitted by the OFP to the EW firmware to generate the one of the jamming techniques, deleting an existing parameter to be transmitted by the OFP to the EW firmware to generate the one of the jamming techniques, changing the range of values for an existing parameter and changing the order of the parameters to be transmitted by the OFP to the firmware to generate the one of the jamming techniques, and the OFP transmitting a predetermined default value for a new parameter, introduced when updating the EW firmware, to the EW firmware in response to the OFP being unable to identify the new parameter from the stored parameter sets.

\* \* \* \* \*

UNITED STATES PATENT AND TRADEMARK OFFICE
CERTIFICATE OF CORRECTION

PATENT NO. : 9,965,267 B2
APPLICATION NO. : 14/945992
DATED : May 8, 2018
INVENTOR(S) : Marr, Jr. et al.

Page 1 of 1

It is certified that error appears in the above-identified patent and that said Letters Patent is hereby corrected as shown below:

On the Title Page

In item (72), in "Inventors", in Column 1, Line 2, delete "Jeffrey" and insert --Jeffery-- therefor Signed and Sealed this
Twenty-eighth Day of May, 2019

Andrei Iancu
*Director of the United States Patent and Trademark Office*